(12) United States Patent
Kim et al.

(10) Patent No.: US 9,029,009 B2
(45) Date of Patent: May 12, 2015

(54) RECHARGEABLE BATTERY

(71) Applicant: Samsung SDI Co., Ltd., Yongin-si, Gyeonggi-do (KR)

(72) Inventors: Shin-Jung Kim, Yongin-si (KR); Dae-Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 151 days.

(21) Appl. No.: 13/796,306

(22) Filed: Mar. 12, 2013

(65) Prior Publication Data

US 2014/0045041 A1    Feb. 13, 2014

(30) Foreign Application Priority Data

Aug. 7, 2012    (KR) .......................... 10-2012-0086476

(51) Int. Cl.
*H01M 2/00* (2006.01)
*H01M 10/04* (2006.01)
*H01M 2/02* (2006.01)
*H01M 10/0587* (2010.01)

(52) U.S. Cl.
CPC .......... *H01M 10/0431* (2013.01); *H01M 2/022* (2013.01); *H01M 10/0587* (2013.01); *H01M 10/04* (2013.01)

(58) Field of Classification Search
CPC ............ Y02E 60/122; H01M 10/0525; H01M 10/052; H01M 10/0587; H01M 10/0431; H01M 2/022
USPC ......................................................... 429/163
See application file for complete search history.

(56) References Cited

U.S. PATENT DOCUMENTS

| | | | | |
|---|---|---|---|---|
| 7,935,440 | B2 * | 5/2011 | Shin | 429/163 |
| 8,206,844 | B2 * | 6/2012 | Meguro et al. | 429/94 |
| 8,455,124 | B2 * | 6/2013 | Kim | 429/94 |
| 8,563,156 | B2 * | 10/2013 | Bak | 429/129 |
| 8,808,900 | B2 * | 8/2014 | Hyung et al. | 429/122 |
| 2004/0258987 | A1 * | 12/2004 | Shin | 429/163 |
| 2006/0121341 | A1 * | 6/2006 | Hosoda et al. | 429/161 |
| 2007/0269711 | A1 * | 11/2007 | Meguro et al. | 429/94 |
| 2009/0246619 | A1 * | 10/2009 | Bak | 429/174 |
| 2011/0076549 | A1 * | 3/2011 | Kim | 429/174 |
| 2011/0091748 | A1 * | 4/2011 | Hyung et al. | 429/7 |

FOREIGN PATENT DOCUMENTS

| | | |
|---|---|---|
| JP | 11-204130 | 7/1999 |
| KR | 10-2009-0102085 | 9/2009 |

OTHER PUBLICATIONS

Patent Abstracts of Japan and Machine English Translation of JP 11-204130 (17 sheets).

* cited by examiner

*Primary Examiner* — Stewart Fraser
(74) *Attorney, Agent, or Firm* — Christie, Parker & Hale, LLP

(57) ABSTRACT

A rechargeable battery including: an electrode assembly; a center pin arranged at a center of the electrode assembly; a case containing the electrode assembly; and a cap assembly coupled to an opening of the case and electrically connected to the electrode assembly, and the center pin includes a first pipe arranged at the center of the electrode assembly, and a second pipe arranged in the first pipe with a buffering space between the first pipe and the second pipe, the second pipe having a strength that is different from a strength of the first pipe.

11 Claims, 12 Drawing Sheets

RECHARGEABLE BATTERY

CROSS-REFERENCE TO RELATED APPLICATION

This application claims priority to and the benefit of Korean Patent Application No. 10-2012-0086476, filed on Aug. 7, 2012 in the Korean Intellectual Property Office, the entire content of which is incorporated herein by reference.

BACKGROUND

1. Field

Aspects of embodiments of the present invention relate to a rechargeable battery.

2. Description of the Related Art

A demand for a rechargeable battery as an energy source increases according to technical development for a mobile device. For example, a cylindrical rechargeable battery may include an electrode assembly formed by spirally winding electrodes disposed at both sides of a separator and the separator together in the shape of a jelly roll, a center pin disposed in a hollow portion in the center of the electrode assembly, a case containing the electrode assembly therein, and a cap assembly closing and sealing an open side of the case.

The center pin may be formed of a material having compression strength to prevent deformation occurring from the electrode assembly, and induces gas and heat generated due to overcharging or short circuit from the inside of the electrode assembly to the cap assembly provided with a safety device. Accordingly, there is a need for deformation to be minimized or the shape to be firmly maintained when external impact or front side compression is applied to the center pin.

The above information disclosed in this Background section is only for enhancement of invention understanding of the background of the described technology and therefore it may contain information that does not form the prior art that is already known in this country to a person of ordinary skill in the art.

SUMMARY

According to an aspect of embodiments of the present invention, a rechargeable battery may reduce damage to an electrode assembly by minimizing or reducing deformation of a center pin under compression.

According to another aspect of embodiments of the present invention, a rechargeable battery may maintain a wide short-circuit area of the electrode assembly by maintaining the shape and minimizing or reducing deformation of the center pin caused by impact.

According to an embodiment of the present invention, a rechargeable battery includes: an electrode assembly; a center pin arranged at a center of the electrode assembly; a case containing the electrode assembly; and a cap assembly coupled to an opening of the case and electrically connected to the electrode assembly, and the center pin includes a first pipe arranged at the center of the electrode assembly, and a second pipe arranged in the first pipe with a buffering space between the first pipe and the second pipe, the second pipe having a strength that is different from a strength of the first pipe.

The first pipe may have a first strength, and the second pipe may have a second strength greater than the first strength.

The first pipe may have a first thickness, and the second pipe may be formed of a same material as the first pipe and have a second thickness greater than the first thickness.

In one embodiment, the first pipe includes a cylinder portion having a first diameter and a first length; and an inclined portion extended from lateral ends of the cylinder portion, the second pipe has a second diameter that is less than the first diameter and a second length that is greater than the first length, and lateral ends of the second pipe are supported by inner sides of the inclined portion.

In one embodiment, the first pipe includes a cylinder portion having a first diameter; and an inclined portion having a diameter gradually decreasing from the first diameter away from lateral ends of the cylinder portion, the second pipe includes a cylinder having a second diameter that is less than the first diameter, and lateral ends of the second pipe are supported by inner sides of the inclined portion in a linear contact manner.

A center line of the inclined portion and the cylinder portion may be a straight line.

A gap between the first pipe and the second pipe that defines the buffering space may be substantially uniform along a circumference direction.

The inclined portion may be offset toward one side from a center of the cylinder portion.

A gap between the first pipe and the second pipe that defines the buffering space may gradually increase and decrease along a circumference direction.

In one embodiment, the first pipe includes a first cylinder portion having a first diameter and a first length; and a first inclined portion extended from lateral ends of the first cylinder portion, and the second pipe includes a second cylinder portion having a second diameter that is less than the first diameter and a second length that is greater than the first length; and a second inclined portion extended from lateral ends of the second cylinder portion and supported by the first inclined portion in a surface contact manner.

In one embodiment, the first pipe includes a cylinder portion having a first diameter and a first length; and an inclined portion extended from lateral ends of the cylinder portion, the second pipe has a second length that is greater than the first length, and a diameter that is greatest at lateral ends of the second pipe in a lengthwise direction and gradually decreases in the lengthwise direction toward a center of the second pipe, and the lateral ends of the second pipe are supported by the inclined portion in a linear contact manner.

In one embodiment, the first pipe includes a cylinder portion having a first diameter and a first length; and an inclined portion extended from lateral ends of the cylinder portion, the second pipe has a second length that is greater than the first length, and a diameter that is smallest at lateral ends of the second pipe in a lengthwise direction and gradually increases in the lengthwise direction toward a center of the second pipe, and the lateral ends of the second pipe are supported by the inclined portion in a linear contact manner.

As described, according to an aspect of an embodiment of the present invention, the dual-structured center pin having a buffering space is formed by the first pipe and the second pipe, and therefore the first pipe is deformed within a range of the buffering space when a compression load is applied to the rechargeable battery, thereby minimizing or reducing deformation of the center pin. Accordingly, when the compression load is applied to the rechargeable battery, damage to the electrode assembly can be reduced and internal gas can be stably induced.

In addition, when an impact load is applied to the rechargeable battery, the first pipe is deformed within the range of the buffering space and the second pipe is supported such that the deformation of the center pin can be minimized or reduced, thereby maintaining the shape of the center pin. Thus, when the impact load is applied to the rechargeable battery, a short-circuit area of the electrode assembly can be maintained to be wide. Therefore, explosion and firing of the rechargeable battery due to an internal short circuit of the electrode assembly can be prevented or substantially prevented.

BRIEF DESCRIPTION OF THE DRAWINGS

The accompanying drawings, together with the specification, illustrate some exemplary embodiments of the present invention, and, together with the description, serve to explain aspects and principles of the present invention.

DESCRIPTION OF REFERENCE NUMERALS INDICATING SOME ELEMENTS IN THE DRAWINGS

Figure 1:
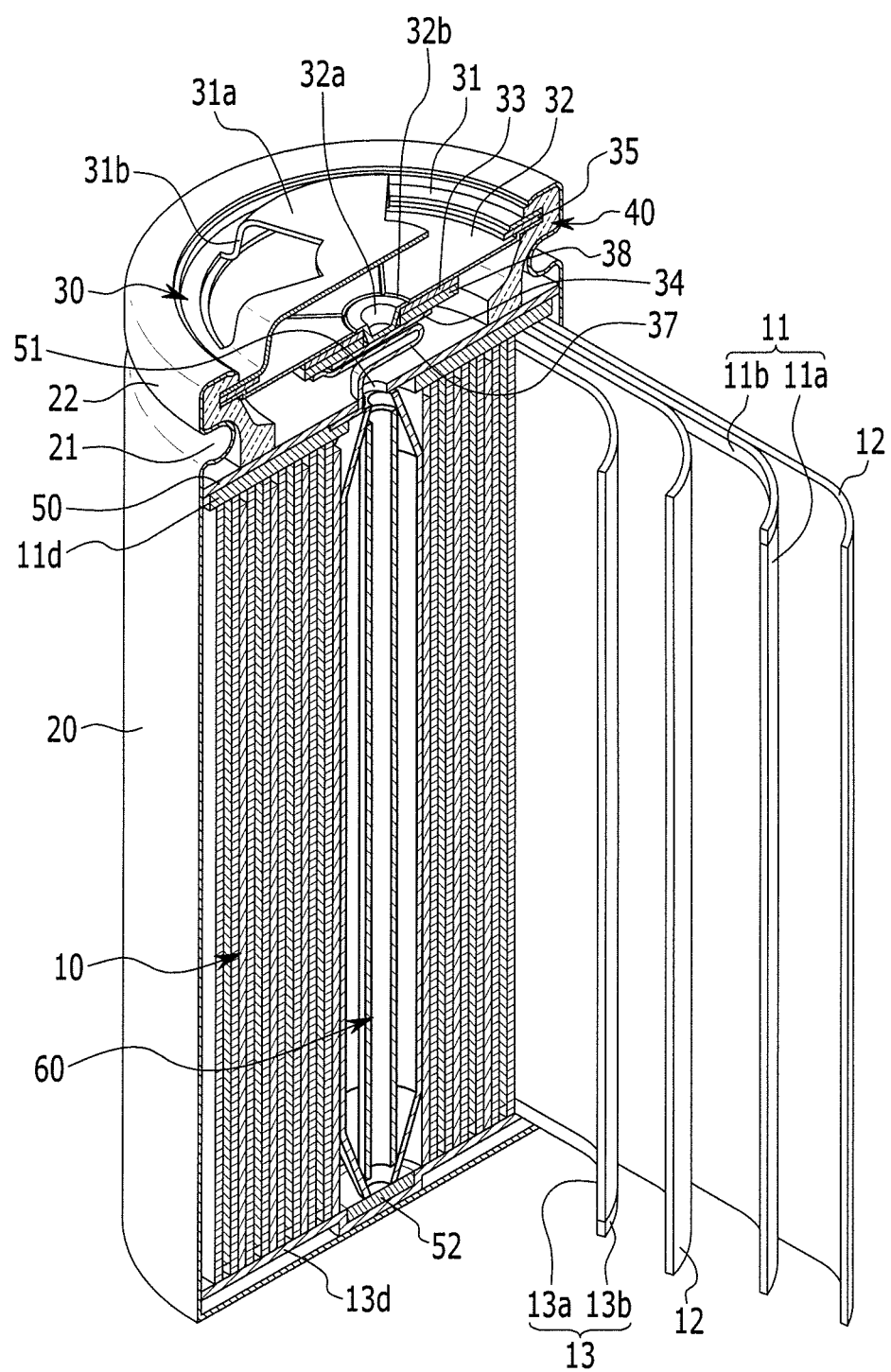
FIG. 1 is a cross-sectional view of a rechargeable battery according to an exemplary embodiment of the present invention.

| | |
|---|---|
| 10: electrode assembly | 11: first electrode |
| 11a, 13a: coated region | 11b, 13b: uncoated region |
| 11d: first current collecting plate | 13d: second current collecting plate |
| 12: separator | 13: second electrode |
| 20: case | 21: beading portion |
| 22: clamping portion | 30: cap assembly |
| 31: cap plate | 31a: protrusion |
| 31b: exhaust hole | 32: vent plate |
| 32a: vent | 32b: notch |
| 33: insulating member | 34: sub-plate |
| 35: positive temperature coefficient element (PTC) | |
| 37: lead tab | 38: middle plate |
| 40: gasket | 50: insulating plate |
| 51: through-hole | 60, 260, 360, 460, 560: center pin |
| 61, 63, 71, 73, 75: first pipe | 62, 64, 72, 74, 76: second pipe |
| 611, 631, 711, 721, 731, 751: cylinder portion | |
| 612, 632, 712, 722, 732, 752: inclined portion | |
| C1, C2: gap | D1, D2: first and second diameters |
| L1, L2: first and second lengths | P: load |
| S1, S2, S3, S4, S5: buffering space | t1, t2: first and second thicknesses |

DETAILED DESCRIPTION

The present invention is described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a cross-sectional view of a rechargeable battery according to an exemplary embodiment of the present invention. Referring to FIG. 1, a rechargeable battery according to an exemplary embodiment of the present invention includes an electrode assembly 10 performing charging and discharging operation, a case 20 containing the electrode assembly 10 therein, a cap assembly 30 coupled to an opening of the case 20 using a gasket 40 and electrically connected to the electrode assembly 10, an insulating plate 50 provided between the cap assembly 30 and the electrode assembly 10, and a center pin 60 disposed in the center of the electrode assembly 10.

The electrode assembly 10 includes a first electrode 11 (e.g., a positive electrode), a separator 12, and a second electrode 13 (e.g., a negative electrode) that are sequentially layered. The electrode assembly 10, in one embodiment, is formed by winding the first electrode 11, the second electrode 13, and the separator 12, which is an insulator disposed between the first and second electrodes 11 and 13, in a jelly roll shape.

In one embodiment, for example, the electrode assembly 10 may be formed in the shape of a cylinder. The center pin 60 is provided in the center of the cylindrical electrode assembly 10 to maintain the electrode assembly 10 in the shape of a cylinder, and induces gas and heat generated from the inside of the electrode assembly 10 due to overcharging or short circuit to the cap assembly 30.

The center pin 60, according to an exemplary embodiment of the present invention, is formed of a material having compression strength such that deformation of the electrode assembly 10 is prevented or substantially prevented. In addition, the center pin 60 is formed such that deformation is minimized or reduced, and firmly maintains a shape before deformation when receiving a whole compression load or local impact load from an external side of the rechargeable battery.

The first electrode 11 and the second electrode 13 include coated regions 11a and 13a, respectively, where an active material is coated on both sides of a current collector formed of a thin metal plate, and uncoated regions 11b and 13b, respectively, where the active material is not coated such that the current collector is exposed and set at opposite ends of the first and second electrodes 11 and 13.

In one embodiment, in a jelly roll state, a first current collecting plate 11d (e.g., a positive current collecting plate) is connected to the uncoated region 11b of the first electrode 11 of the electrode assembly 10, and a second current collecting plate 13d (e.g., a negative current collecting plate) is connected to the uncoated region 13b of the second electrode 13 of the electrode assembly 10.

The case 20 enables insertion of the electrode assembly 10 from the outside through an opening at one side thereof, and, in one embodiment, is formed in the shape of a cylinder and thus receives the cylindrical electrode assembly 10. The case 20 is connected to the second current collecting plate 13d and thus acts as a terminal (e.g., a negative terminal) in the rechargeable battery, and may be formed of a conductive metal such as aluminum, an aluminum alloy, or nickel-plated steel.

The cap assembly 30 is coupled to the opening of the case 20 by providing the gasket 40 and, thus, electrically insulated from the case 20, and closes the case 20 that receives the electrode assembly 10 and the electrolyte solution in an airtight manner, and is electrically connected with the electrode assembly 10 by providing a current blocking device.

In one embodiment, for example, the cap assembly 30 includes a cap plate 31, a positive temperature coefficient element (PTC) 35, a vent plate 32, an insulating member 33, a middle plate 38, and a sub-plate 34 that are sequentially disposed from the outside to an inner side of the case 20.

The cap plate 31, in one embodiment, is connected to the first current collecting plate 11d and thus acts as a terminal (e.g., a positive terminal) in the rechargeable battery, and forms a protrusion 31a protruded to the outside of the case 20 and an exhaust hole 31b open toward a side direction of the protrusion 31a to discharge an internal gas.

In one embodiment, a current blocking device is formed of the vent plate 32, the sub-plate 34, and a connection portion that connects the vent plate 32 and the sub-plate 34. The connection portion may be formed by welding the vent plate 32 and sub-plate 34.

The vent plate 32 forming one side of the current blocking device is provided at an inner side of the cap plate 31, and is electrically connected to the sub-plate 34 that forms the other side of the current blocking device.

In one embodiment, the vent plate 32 includes a vent 32a, and the vent 32a is ruptured under a certain pressure (e.g., a predetermined pressure condition) to discharge the internal gas to the outside and block electrical connection with the sub-plate 34.

In one embodiment, for example, the vent 32a protrudes toward the inner side of the case 20 from the vent plate 32. That is, the vent 32a protrudes toward the sub-plate 34. The vent plate 32 is provided with a notch 32b that guides the rupture of the vent 32a at a periphery of the vent 32a.

Thus, when gas is generated and the internal pressure of the case 20 is increased, the notch 32b is ruptured and discharges the gas so as to prevent or substantially prevent the rechargeable battery from exploding.

In this case, the connection portion of the vent plate 32 and the sub-plate 34 is separated due to the rupture of the vent 32a such that the electrode assembly 10 and the cap plate 31 are electrically separated from each other.

The PTC 35, in one embodiment, is provided between the cap plate 31 and the vent plate 32 to control a current flow between the cap plate 31 and the vent plate 32 depending on an internal temperature of the rechargeable battery.

When the internal temperature is within a certain range (e.g., a predetermined range), the PTC 35 acts as a conductor and electrically connects the cap plate 31 and the vent plate 32. However, when the internal temperature exceeds a certain temperature (e.g., a predetermined temperature), the PTC 35 has greatly increased (e.g., infinitely increasing) electrical resistance. Therefore, the PTC 35 can block flow of a charging or discharging current between the cap plate 31 and the vent plate 32.

In one embodiment, the sub-plate 34 faces the vent plate 32 with an insulating member 33 interposed therebetween, and is electrically connected to the vent 32a. In one embodiment, a middle plate 38 is disposed between the insulating member 33 and the sub-plate 34. The vent 32a protrudes through the insulating member 33 and the middle plate 38 and is connected with the sub-plate 34.

Thus, in one embodiment, the middle plate 38 is electrically connected to the sub-plate 34 and the vent 32a. In one embodiment, the middle plate 38 is connected to a lead tab 37 (e.g., by welding), and the lead tab 37 is connected to the first current collecting plate 11d (e.g., by welding).

The first current collecting plate 11d, in one embodiment, is electrically connected to the cap plate 31 sequentially via the lead tab 37, the sub-plate 34, the vent 32a, the middle plate 38, the vent plate 32, and the PTC 35.

In one embodiment, the insulating plate 50 is disposed between the first current collecting plate 11d and the sub-plate 34 to electrically insulate the first current collecting plate 11d with respect to the sub-plate 34 or the middle plate 38. The lead tab 37 is connected to the first current collecting plate 11d and thus connected to the middle plate 38 through a through-hole 51 of the insulating plate 50.

The cap assembly 30, in one embodiment, is inserted into the opening of the case 20 through the gasket 40 and fixed to the opening of the case 20 through a crimping process.

In this case, the case 20 forms a beading portion 21 concave with respect to a diameter direction of the case 20, and a clamping portion 22 that holds the external circumference of the cap assembly 30 through the gasket 40 in the opening side.

The center pin 60 is disposed in the center of the electrode assembly 10 and may be formed of a metal material having high strength. Thus, the center pin 60 has conductivity, and lateral ends of the center pin 60 maintain an electrical insulation state with respect to the first current collecting plate 11d and the second electrode current collecting plate 13d.

In one embodiment, an insulating pad 52 is disposed between a lower end of the center pin 60 and the second current collecting plate 13d. In one embodiment, an upper end of the center pin 60 penetrates a through-hole formed at a center of the first current collecting plate 11d in an insulated manner and is supported by the insulating plate 50.

In this case, the upper end of the center pin 60 is separated from the through-hole of the first current collecting plate 11d. In one embodiment, an insulating member (not shown) may be provided between the upper end of the center pin 60 and the through-hole of the first current collecting plate 11d. Thus, movement of the center pin 60 in a lengthwise direction of the center pin 60 is restricted, and the center pin 60 maintains a stable state in the center of the electrode assembly 10.

Figure 2:
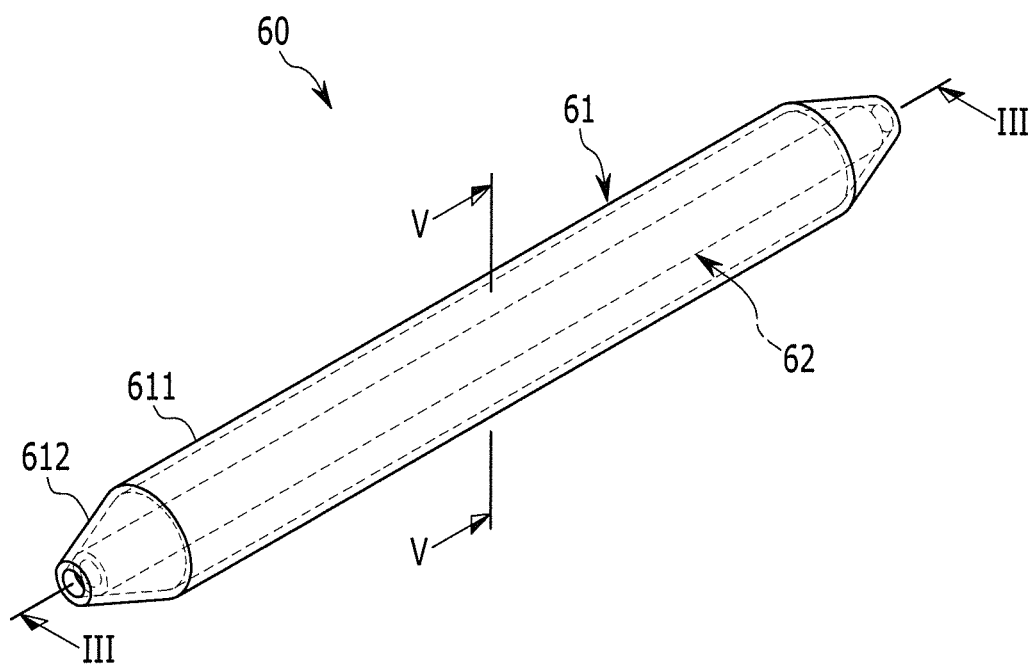
FIG. 2 is a perspective view of a center pin of the rechargeable battery of FIG. 1, according to an embodiment of the present invention.
Figure 3:
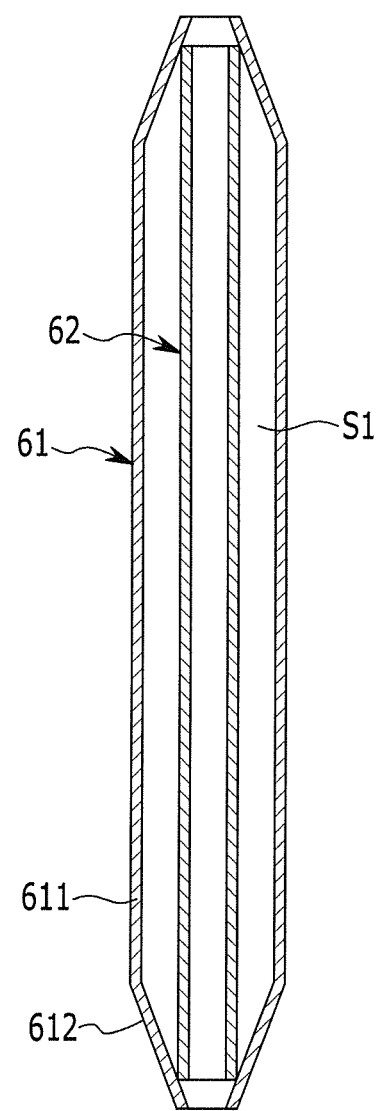
FIG. 3 is a cross-sectional view of the center pin of FIG. 2, taken along the line III-III.

FIG. 2 is a perspective view of the center pin 60; and FIG. 3 is a cross-sectional view of the center pin 60, taken along the line III-III of FIG. 2. Referring to FIG. 2 and FIG. 3, the center pin 60, in one embodiment, includes a first pipe 61 inserted to the center of the electrode assembly 10 and a second pipe 62 inserted into the first pipe 61 with a buffering space S1 between the first and second pipes 61 and 62. The first and second pipes 61 and 62, in one embodiment, respectively have different strengths.

Figure 4:
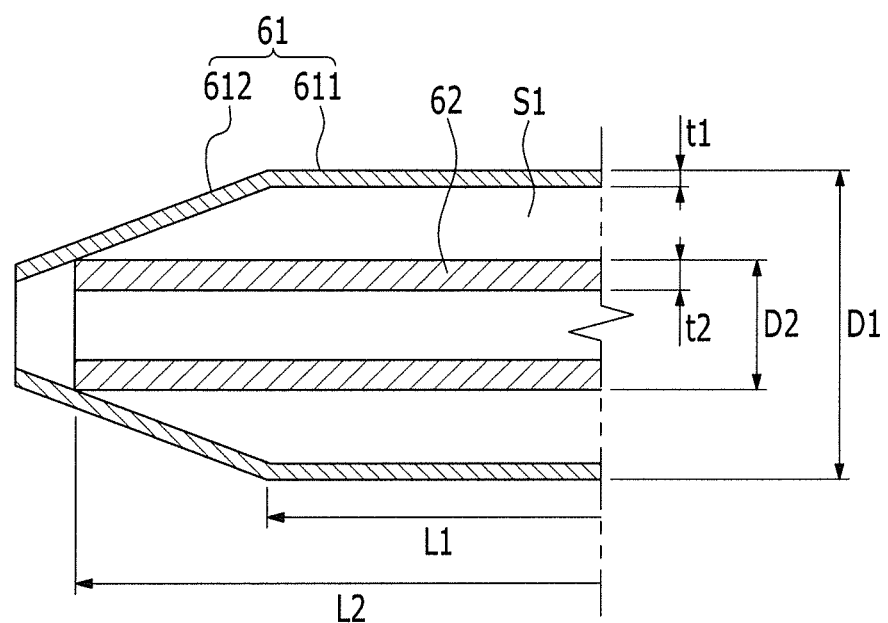
FIG. 4 is an enlarged cross-sectional view of an end of the center pin of FIG. 2.

FIG. 4 is an enlarged cross-sectional view of an end of the center pin 60. Referring to FIG. 2 to FIG. 4, the first pipe 61 disposed at the outer side may have a first strength, and the second pipe 62 may have a second strength that is stronger than the first strength. In one embodiment, the first and second pipes 61 and 62 may be formed of the same material, and the first pipe 61 may have a first thickness t1 and the second pipe 62 may have a second thickness t2 that is greater than the first thickness t1.

Therefore, when a compression load is applied to the rechargeable battery, the first pipe 61 having the weaker strength may absorb the compression load by being deformed within a range of the buffering space S1, and the second pipe 61 having the stronger strength may not be deformed by the load weakened through the first pipe 61 or may experience a minimum or small deformation.

That is, since the center pin 60 maintains a shape that is close to the shape before deformation or its original shape due to the minimum or small deformation, damage to the electrode assembly 10 is prevented or reduced. In addition, when an impact load is applied to the rechargeable battery, a short-circuit area of the electrode assembly 10 is maintained to be wide. Therefore, explosion and firing of the rechargeable battery due to an internal short circuit of the electrode assembly 10 can be prevented or substantially prevented.

Referring to FIG. 2 to FIG. 4, in one embodiment, the first pipe 61 includes a cylinder portion 611 having a first length L1 of a first diameter D1, and an inclined portion 612 further extended from lateral ends of the cylinder portion 611. The inclined portion 612 has a structure in which the diameter thereof gradually decreases from the first diameter D1 away from the lateral ends of the cylinder portion 611.

The second pipe 62 has a second diameter D2 that is smaller than the first diameter D1 and a second length L2 that is greater than the first length L1. In one embodiment, the second length L2 of the second pipe 62 is greater than the first length L1 and less than the entire length of the first pipe 61 that includes the inclined portion 612. For purposes of illustration, the first and second diameters D1 and D2 are indicated as the exterior diameters of the first and second pipes 61 and 62, but they may be illustrated as the respective interior diameters.

In one embodiment, lateral ends of the second pipe 62 are supported by the inner side of the inclined portion 612. In this case, lateral ends of the second pipe 62 are supported in a linear contact manner by the inner side of the inclined portion 612 such that the second pipe 62 may be fixed in the first pipe 61 with respect to the lengthwise direction of the center pin 60.

The first pipe 61 and the second pipe 62 may be welded to each other while the second pipe 62 is inserted in the first pipe 61. In this condition, the inclined portion 612 facilitates installation of the second pipe 62 in the first pipe 61 in a fixed manner and forms an open structure for induction of internal gas.

In one embodiment, in the first pipe 61, the centerline of the inclined portion 612 and the centerline of the cylinder portion 611 are disposed on the same straight line. In this case, the inclined portion 612 has a shape of a cone or truncated circular cone connected to lateral ends of the cylinder portion 611. Thus, the first and second pipes 61 and 62 form the dual-structured center pin 60 that is stable at the inclined portion 612.

Figure 5:
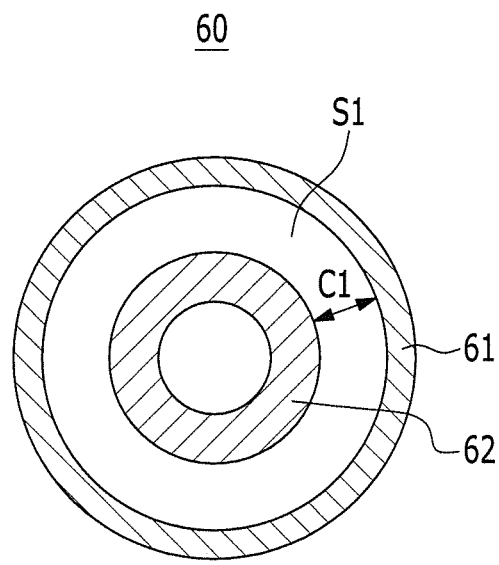
FIG. 5 is a cross-sectional view of the center pin of FIG. 2, taken along the line V-V.
Figure 6:
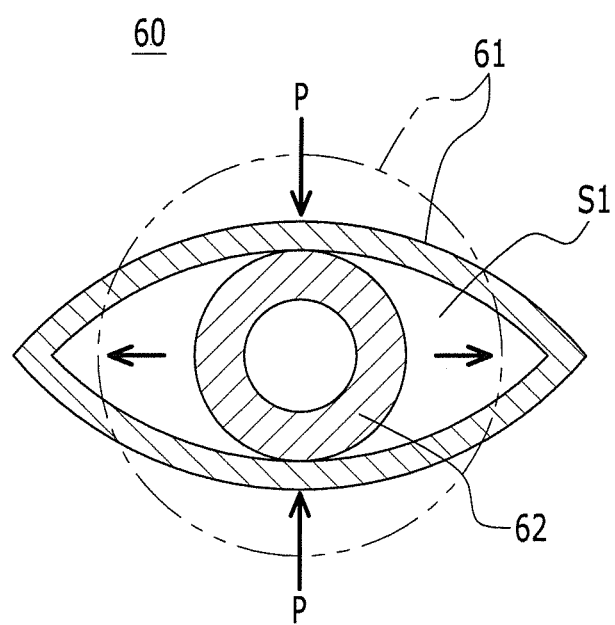
FIG. 6 is a cross-sectional view of the center pin of FIG. 2, shown in a deformed state.

FIG. 5 is a cross-sectional view of the center pin 60, taken along the line V-V of FIG. 2; and FIG. 6 is a cross-sectional view of the center pin 60, shown in a deformation state. Referring to FIG. 2 to FIG. 6, the first pipe 61 and the second pipe 62 form the buffering space S1 therebetween.

In one embodiment, a gap C1 between the first pipe 61 and the second pipe 62 that sets the buffering space S1 is uniform or substantially uniform along a circumference direction.

Thus, the first and second pipes 61 and 62 form a stable dual-structured center pin 60 in the cylinder portion 611.

The stable dual-structure in the cylinder portion 611 and the inclined portion 612 can uniformly or substantially uniformly absorb a load in the circumference direction through the first pipe 61 when an external compression load and an impact load are applied to the rechargeable battery.

Referring to FIG. 6, when a load P is applied to the rechargeable battery, the load P is applied to the center pin 60 through the electrode assembly 10. Due to the load P, the first pipe 61 at the external side is deformed into the buffering space S1 due to its relatively weak strength. In this case, the load P is reduced by the deformation of the first pipe 61.

Subsequently, the load P reduced in the first pipe 61 is applied to the second pipe 62. The second pipe 62 provides a supporting force with a strength that is stronger than the first pipe 61. Therefore, no additional deformation may occur in the first and second pipes 61 and 62, or the deformation of the second pipe 62 may be minimized or reduced.

Some other exemplary embodiments of the present invention are described below, and description of features and configurations that are the same as described above with respect to the above-described exemplary embodiment will not be repeated.

Figure 7:
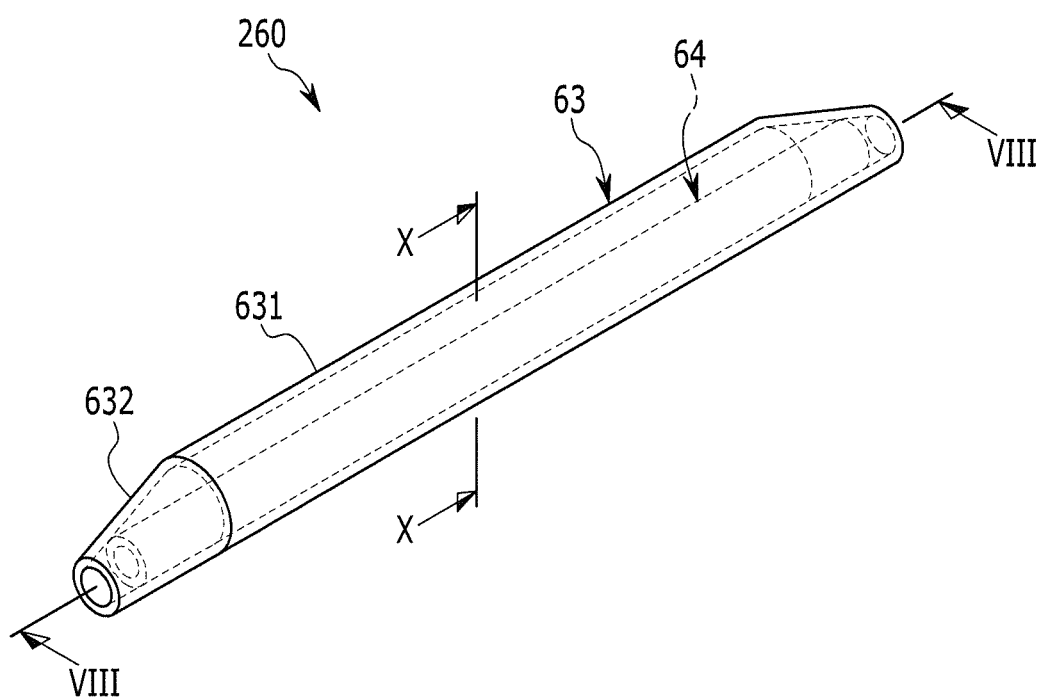
FIG. 7 is a perspective view of a center pin of a rechargeable battery, according to another exemplary embodiment of the present invention.
Figure 8:
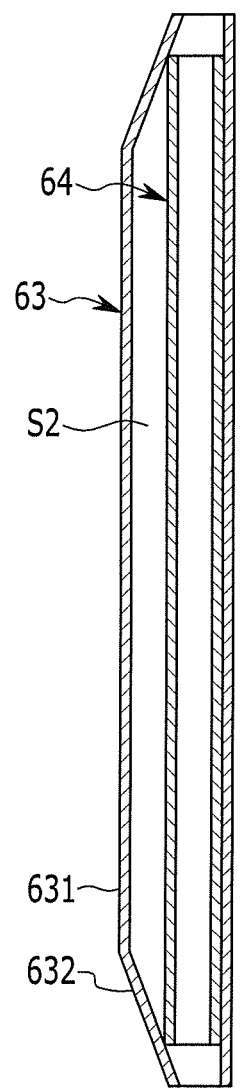
FIG. 8 is a cross-sectional view of the center pin of FIG. 7, taken along the line VIII-VIII.

FIG. 7 is a perspective view of a center pin 260 of a rechargeable battery according to another exemplary embodiment of the present invention; FIG. 8 is a cross-sectional view of the center pin 260, taken along the line VIII-VIII of FIG. 7; and FIG. 9 is an enlarged cross-sectional view of an end of the center pin 260.

Figure 9:
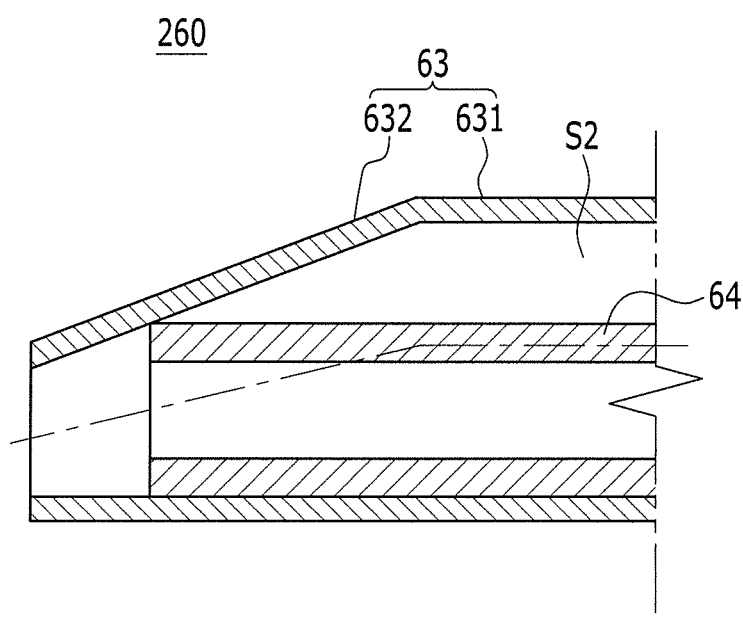
FIG. 9 is an enlarged cross-sectional view of an end of the center pin of FIG. 8.

Referring to FIG. 7 to FIG. 9, an inclined portion 632 in the center pin 260 according to another exemplary embodiment is disposed at a position biased, or offset, toward one side from the center of a cylinder portion 631. Thus, a second pipe 64 of the center pin 260 maintains concentricity toward one side in a first pipe 63 of the center pin 260. In one embodiment, the second pipe 64 linearly contacts the first pipe 63 along a lengthwise direction in the first pipe 63.

Figure 10:
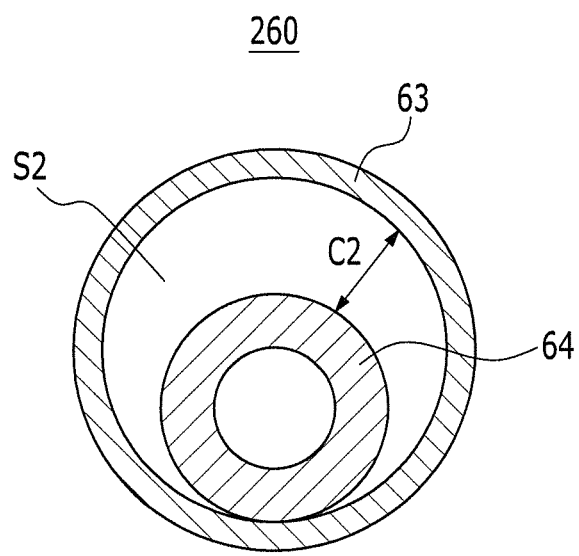
FIG. 10 is a cross-sectional view of the center pin of FIG. 7, taken along the line X-X.
Figure 11:
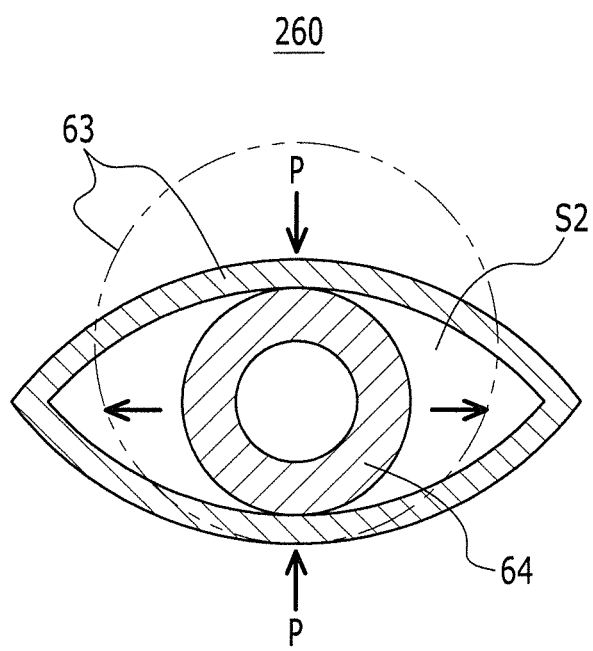
FIG. 11 is a cross-sectional view of the center pin of FIG. 7, shown in a deformed state.

FIG. 10 is a cross-sectional view of the center pin 260, taken along the line X-X of FIG. 7; and FIG. 11 is a cross-sectional view of the center pin 260, shown in a deformed state. Referring to FIG. 10 and FIG. 11, a gap C2 between the first pipe 63 and the second pipe 64 forming a buffering space S2 is gradually increased and decreased along a circumference direction.

That is, the gap C2 is greatest at a side opposite to the side of the linear contact in the linear-contact area.

In the first pipe 63, the centerline of the inclined portion 632 and the centerline of the cylinder portion 631 are bent at a location where the inclined portion 632 and the cylinder portion 631 are connected with each other. In one embodiment, the second pipe 64 is fixed through lateral ends thereof in the first pipe 63 in the inclined portion 632. Thus, compared to the center pin 60 described above, a work for coupling the second pipe 64 in the first pipe 63 may be easily performed in the center pin 260.

In the center pin 260, a portion of linear contact between the first and second pipes 63 and 64 has a strong supporting force, and the center pin 260 may experience deformation in a portion where the first pipe 63 and the second pipe 64 are separated from each other such that the center pin 260 can absorb the load P. That is, the center pin 260 may have an orientation with respect to a circumference direction when absorbing the load P and providing the supporting force.

In the rechargeable battery including the center pin 260, a portion having strong strength and a portion having high load absorbability are partitioned, and accordingly the rechargeable battery can be effectively used in an area that requires strong supporting force in a specific direction or excellent load absorbability.

Figure 12:
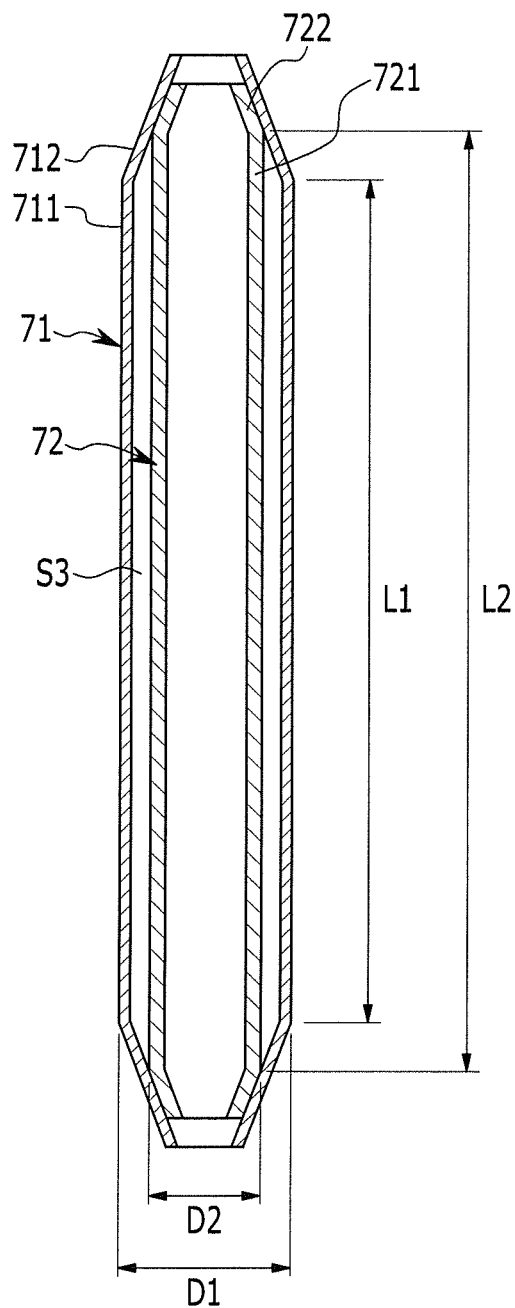
FIG. 12 is a cross-sectional view of a center pin of a rechargeable battery, according to another exemplary embodiment of the present invention.

FIG. 12 is a cross-sectional view of a center pin 360 of a rechargeable battery, according to another exemplary embodiment of the present invention. Referring to FIG. 12, a first pipe 71 of the center pin 360 includes a first cylinder portion 711 having a first length L1 and a first diameter D1, and a first inclined portion 712 further extended from lateral ends of the first cylinder portion 711.

A second pipe 72 of the center pin 360 includes a second cylinder portion 721 having a second diameter D2 that is smaller than the first diameter D1 and a second length L2 that is greater than the first length L1, and a second inclined portion 722 further extended from lateral ends of the second cylinder portion 721 and supported by the first inclined portion 712 in a surface contact manner.

The first and second pipes 71 and 72 form a firm coupling structure while defining a buffering space S3 therebetween in a lengthwise direction by the surface contact of the first and second inclined portions 712 and 722. That is, the surface contact coupling structure of the first and second inclined portions 712 and 722 provides a stronger fastening force compared to the linear contact coupling structure of the inclined portion 612 as described above with respect to the first pipe 61 and the second pipe 62 of the center pin 60.

Figure 13:
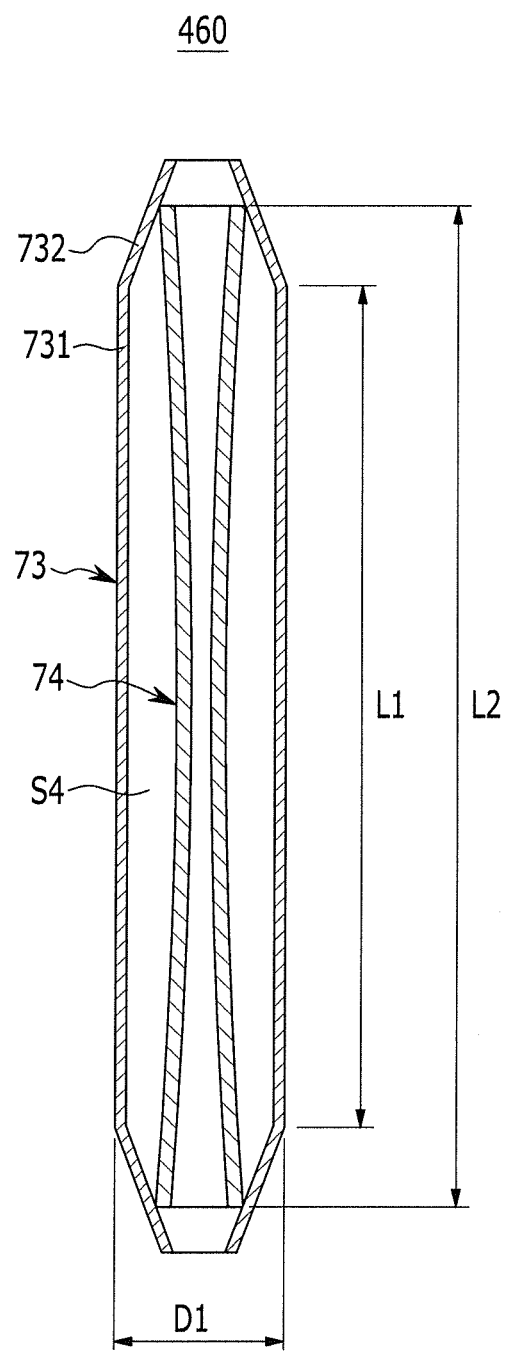
FIG. 13 is a cross-sectional view of a center pin of a rechargeable battery, according to another exemplary embodiment of the present invention.

FIG. 13 is a cross-sectional view of a center pin 460 of a rechargeable battery, according to another exemplary embodiment of the present invention. Referring to FIG. 13, a first pipe 73 of the center pin 460 includes a cylinder portion 731 having a first diameter D1 and a first length L1, and inclined portions 732 further extended from lateral ends of the cylinder portion 731.

A second pipe 74 of the center pin 460 has a second length L2 that is greater than the first length L1, and a diameter of the second pipe 74 is greatest at lateral ends in a lengthwise direction and gradually decreases in the lengthwise direction toward a center of the second pipe 74. The lateral ends of the second pipe 74 are supported by the inclined portions 732 in a linear contact manner.

The second pipe 74 has a concave structure along the lengthwise direction thereof, and thus a buffering space S4 between the first pipe 73 and the second pipe 74 is greatest at the center in the lengthwise direction of the first pipe 73 and the smallest between the inclined portions 732 of the first pipe 73 and the lateral ends of the second pipe 74 due to the linear contact between the lateral ends of the second pipe 74 and the inclined portions 732 of the first pipe 73.

When a compression load is applied to the rechargeable battery, the first pipe 73 having relatively weak strength is deformed within a range of the buffering space S4 that is relatively large and greatly absorbs the compression load, and the second pipe 74 having relatively strong strength receives a load sufficiently weakened through the first pipe 73. Load absorbability of the center pin 460 is greater than load supporting force.

Figure 14:
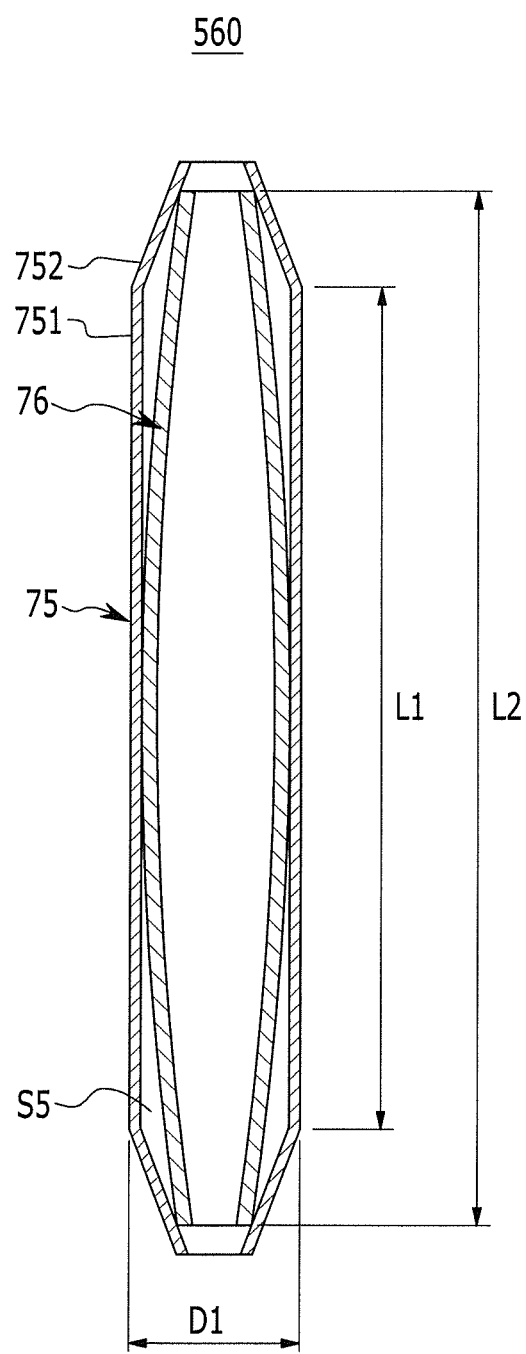
FIG. 14 is a cross-sectional view of a center pin of a rechargeable battery, according to another exemplary embodiment of the present invention.

FIG. 14 is a cross-sectional view of a center pin 560 of a rechargeable battery, according to another exemplary embodiment of the present invention. Referring to FIG. 14, a first pipe 75 of the center pin 560 includes a cylinder portion 751 having a first diameter D1 and a first length L1, and inclined portions 752 further extended from lateral ends of the cylinder portion 751.

A second pipe 76 of the center pin 560 has a second length L2 that is greater than the first length L1, and a diameter of the second pipe 76 is smallest at lateral ends in a lengthwise direction and gradually increases in the lengthwise direction toward a center of the second pipe 76. The lateral ends of the second pipe 76 are supported by the inclined portions 752 in a linear contact manner.

The second pipe 76 has a convex structure along the lengthwise direction, and thus a buffering space S5 is formed to be the smallest at the center in the lengthwise direction of the first pipe 75 and the largest between the inclined portion 752 of the first pipe 75 and the lateral ends of the second pipe 76 due to the linear contact between the lateral ends of the second pipe 76 and the inclined portions 752 of the first pipe 75.

When a compression load is applied to the rechargeable battery, the first pipe 75 having relatively weak strength absorbs a small amount of the compression load while being deformed within a range of the buffering space S5, and the second pipe 76 can receive unabsorbed load through the first pipe 75. The load supporting force of the center pin 560 is greater than load absorbability.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
    an electrode assembly;
    a center pin arranged at a center of the electrode assembly;
    a case containing the electrode assembly; and
    a cap assembly coupled to an opening of the case and electrically connected to the electrode assembly,
    wherein the center pin comprises:
        a first pipe arranged at the center of the electrode assembly; and
        a second pipe arranged in the first pipe with a buffering space between the first pipe and the second pipe, the second pipe having a compression strength that is different from a compression strength of the first pipe.

2. The rechargeable battery of claim 1, wherein the first pipe has a first compression strength, and the second pipe has a second compression strength greater than the first compression strength.

3. The rechargeable battery of claim 1, wherein the first pipe has a first thickness, and the second pipe is formed of a same material as the first pipe and has a second thickness greater than the first thickness.

4. The rechargeable battery of claim 1,
    wherein the first pipe comprises:
        a cylinder portion having a first diameter and a first length; and
        an inclined portion extended from lateral ends of the cylinder portion,
    wherein the second pipe has a second diameter that is less than the first diameter and a second length that is greater than the first length, and
    wherein lateral ends of the second pipe are supported by inner sides of the inclined portion.

5. The rechargeable battery of claim 1,
    wherein the first pipe comprises:
        a cylinder portion having a first diameter; and
        an inclined portion having a diameter gradually decreasing from the first diameter away from lateral ends of the cylinder portion,
    wherein the second pipe comprises a cylinder having a second diameter that is less than the first diameter, and
    wherein lateral ends of the second pipe are supported by inner sides of the inclined portion.

6. The rechargeable battery of claim 5, wherein a center line of the inclined portion and the cylinder portion is a straight line.

7. The rechargeable battery of claim 6, wherein as gap between the first pipe and the second pipe that defines the buffering space is substantially uniform along a circumference direction.

8. The rechargeable battery of claim 5, wherein the inclined portion is offset toward one side from a center of the cylinder portion.

9. The rechargeable battery of claim 1,
wherein the first pipe comprises:
- a first, cylinder portion having a first diameter and a first length; and
- a first inclined portion extended from lateral ends of the first cylinder portion, and wherein the second pipe comprises:
- a second cylinder portion having a second diameter that is less than the first diameter and a second length that is greater than the first length; and
- a second inclined portion extended from lateral ends of the second cylinder portion and supported by the first inclined portion.

10. The rechargeable battery of claim 1,
wherein the first pipe comprises;
- a cylinder portion having a first diameter and a first length; and
- an inclined portion extended from lateral ends of the cylinder portion, Wherein the second pipe has a second length that is greater than the first length, and a diameter that is greatest at lateral ends of the second pipe in a lengthwise direction and gradually decreases in the lengthwise direction toward a center of the second pipe, and wherein the lateral ends of the second pipe are supported by the inclined portion.

11. The rechargeable battery of claim 1,
wherein the first pipe comprises;
- a cylinder portion having a first diameter and a first length; and
- an inclined portion extended from lateral ends of the cylinder portion, wherein the second pipe has a second length that is greater than the first length, and a diameter that is smallest at lateral ends of the second pipe in a lengthwise direction and gradually increases in the lengthwise direction toward a center of the second pipe, and wherein the lateral ends of the second pipe are supported by the inclined portion.

* * * * *